Sept. 21, 1954
R. F. WITTERS
2,689,931
COMPENSATING VARIABLE CAPACITOR
Filed Sept. 19, 1951
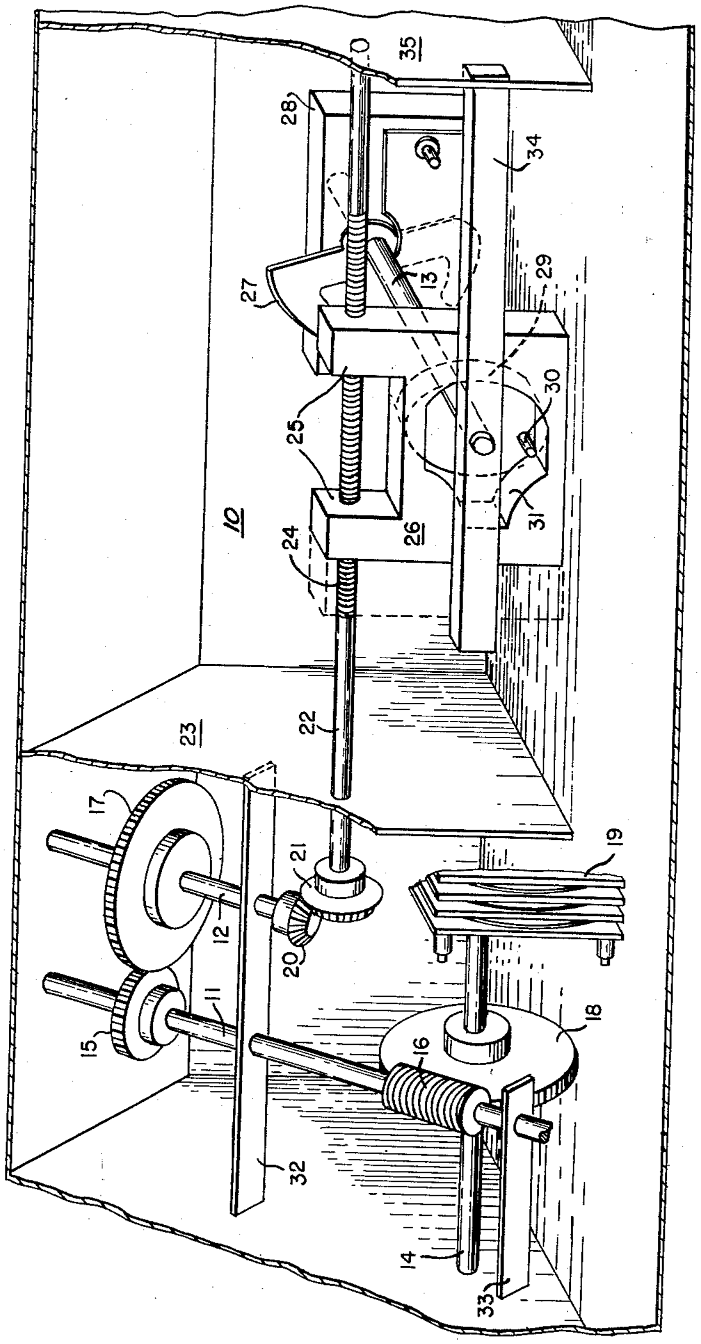
*INVENTOR.*
ROBERT F. WITTERS
*BY* Harry M. Saragovitz
*Attorney*

Patented Sept. 21, 1954

2,689,931

UNITED STATES PATENT OFFICE 2,689,931

COMPENSATING VARIABLE CAPACITOR

Robert F. Witters, Cedar Rapids, Iowa, assignor to the United States of America as represented by the Secretary of the Army Application September 19, 1951, Serial No. 247,323

3 Claims. (Cl. 317—253)

This invention relates to tuning controls and more particularly to condenser controls in typical tuned circuits.

The object of this invention is to provide a variable correcting capacitor in parallel with a tuning capacitor having such correcting capacitor so controlled by the setting of the tuning capacitor that its range is a fixed percentage of the tuning capacity for any setting of the tuning capacitor.

Known tuning controls utilizing parallel correcting capacitors provide a correcting capacitor whose range is constant for any setting of the tuning capacitor thus inherently incorporating a varying degree of control in the correcting capacitor. It is a further object of this invention to overcome this and related disadvantages by providing a predetermined and fixed relation between correcting capacitor range and tuning capacitor setting.

Other objects of this invention will appear in the following description and appended claims, reference being had to the accompanying drawing in which a preferred embodiment of this invention is shown.

The invention is shown in a supporting frame 10 (broken away) on which the operating mechanism is mounted. Shafts 11, 12, 13 and 14 are journaled in bearings housed in frame 10 for additional support. Shafts 11 and 12 are journaled in auxiliary support member 32 which is rigidly secured to frame 10 and fixed support 23. Shaft 11 is further journaled in auxiliary support member 33 to provide definite longitudinal support. Shafts 11 and 13 are extended through frame 10 so as to be accessible for manual manipulation from outside of frame 10 and may be provided with knurled knobs to facilitate such manipulation. Shaft 11 has rigidly mounted thereon gears 15 and 16 engaging gears 17 and 18 and rotor plates of tuning condenser 19. Shaft 12 has rigidly mounted thereon gears 17 and 20 which engage gears 15 and 21 respectively. Shaft 22 is journaled in fixed support 23 and 35 which are rigidly fixed to frame 10 and fix the axial position of shaft 22. Shaft 22 carries gear 21 which is rigidly mounted thereon and is threaded to form worm gear 24 which engages the threaded bores 25 of stop assembly cam 26. Shaft 13 has rigidly mounted thereon the rotor plates 27 of compensating capacitor 28 and also disk 29. Disk 29 has rigidly mounted thereon limiting lug 30 which limits the variable range of compensating capacitor 28 in accordance with limiting lug 30's engagement with cam surface 31. Guide 34 secured by support 35 is provided to prevent cam 26 from turning when gear 24 operates in order to secure conjunctive operation of lug 30 and cam surface 31.

Coarse frequency adjustment is accomplished by rotating shaft 11 which, through gears 16 and 18, rotates shaft 14 and consequently the rotor plates of tuning condenser 19. The turning of shaft 11 causes simultaneous rotational motion of gear 15 which transmits its motion, through gears 17, 20 and 21 and shaft 12, to shaft 22. The threaded segment 24 of shaft 22 causes stop assembly cam 26 to move axially along shaft 22, because of the threaded engagement of segment 24 and the threaded bores 25 of stop assembly cam 26. The axial movement of stop assembly cam 26 allows the rotational limits of limiting lug 30 to change in accordance with the new position of said stop assembly cam 26. Thus, for every position of tuning condenser 19, a range of motion for limiting lug 30 is determined by the configuration of cam surface 31. This limitation of operational motion of limiting lug 30 in turn limits the range over which compensating capacitor 28 can be varied because the limits imposed on limiting lug 30 limit the rotation of disk 29 to which said lug is rigidly secured. Disk 29 being rigidly mounted on shaft 13 in turn limits its rotation and because rotor plates 27 of compensating capacitor 28 are rigidly mounted on shaft 13, their rotation is in turn restricted in accordance with the configuration of cam surface 31.

It is readily apparent that any relationship of compensating capacitor range may be affected for a particular setting of tuning capacitor 19 by means of changing the configuration of cam surface 31. Further, the configuration of rotor plates 27 of compensating capacitor 28 may also be made irregular to cooperate with the designed cam surface 31 in producing a desired relationship.

The end of shaft 13, extended through frame 10, is utilized in varying compensating capacitor 28 through the range permitted by limiting lug 30 acting in conjunction with cam surface 31.

What is claimed is:

1. The combination comprising a tuning capacitor, means connected to said tuning capacitor for varying said tuning capacitor, a cam type stop assembly geared to said means and driven thereby, a variable trimming condenser, a protruding shaft on said trimming condenser, a disk mounted on said shaft, a protruding lug on said disk engaging said stop assembly for varying the limits through which said trimming condenser may be varied in accordance with the configuration of the cam surface of said stop assembly and means connected to said trimming condenser for independently varying its capacity over the limits said cam surface permits.

2. The combination comprising a tuning capacitor, a variable trimming capacitor having irregularly shaped plates for causing disproportional capacity changes therein for angular changes in rotor settings, means connected to said tuning capacitor for varying said tuning capacitor, a cam type stop assembly geared to said means and driven thereby, a protruding shaft on said trimming capacitor; a disk mounted on said shaft, a protruding lug on said disk engaging said stop assembly for varying the limits through which said trimming capacitor may be varied in accordance with the configuration of the cam surface of said stop assembly and means connected to said trimming capacitor for independently varying its capacity over the limits said cam surface permits.

3. In a condenser, a first rotatable element, a second rotatable element, a first shaft means coupled to said first rotatable element for imparting angular movement thereto, a cam type stop assembly geared to said first shaft means and driven thereby for varying the limits through which said second rotatable element may be rotated, a second shaft means coupled to said second rotatable element, a disc mounted on said second shaft means and having an abutment thereon, the engagement of the surface of said cam stop assembly and said abutment determining the ratio between the extent of allowable angular rotation of said second rotatable element and the angular setting of said first rotatable element, and means for rotating said second rotatable element within the allowable limits of its rotation.

References Cited in the file of this patent

UNITED STATES PATENTS

| Number | Name | Date |
|---|---|---|
| 1,536,453 | Pickard | May 5, 1925 |
| 1,633,915 | Yanochowski | June 28, 1927 |
| 1,703,574 | Danielson | Feb. 26, 1929 |
| 1,730,853 | Landon | Oct. 8, 1929 |
| 1,940,228 | Polydoroff | Dec. 19, 1933 |
| 2,421,168 | Stamper | May 27, 1947 |

FOREIGN PATENTS

| Number | Country | Date |
|---|---|---|
| 251,358 | Great Britain | May 3, 1926 |